United States Patent
Fang

(10) Patent No.: US 9,110,332 B2
(45) Date of Patent: Aug. 18, 2015

(54) BACKLIGHT MODULE AND LIQUID CRYSTAL DISPLAY

(75) Inventor: Kuojun Fang, Shenzhen (CN)

(73) Assignee: SHENZHEN CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 384 days.

(21) Appl. No.: 13/519,319

(22) PCT Filed: Apr. 9, 2012

(86) PCT No.: PCT/CN2012/073668
§ 371 (c)(1),
(2), (4) Date: Jun. 26, 2012

(87) PCT Pub. No.: WO2013/143164
PCT Pub. Date: Oct. 3, 2013

(65) Prior Publication Data
US 2013/0258244 A1    Oct. 3, 2013

(30) Foreign Application Priority Data
Mar. 29, 2012 (CN) .......................... 2012 1 0088276

(51) Int. Cl.
*G02F 1/1335* (2006.01)
*F41G 1/34* (2006.01)
*F21V 8/00* (2006.01)

(52) U.S. Cl.
CPC ........ *G02F 1/133615* (2013.01); *G02B 6/0055* (2013.01)

(58) Field of Classification Search
CPC ................ G02B 6/0011; G02B 6/0068; G02F 1/133615; G02F 1/133606; F21V 7/0008; F21V 11/02
USPC ............................................................ 349/61
See application file for complete search history.

(56) References Cited

U.S. PATENT DOCUMENTS

| | | | |
|---|---|---|---|
| 2006/0181901 A1* | 8/2006 | Sakai et al. | 362/613 |
| 2006/0232995 A1* | 10/2006 | Wu et al. | 362/613 |
| 2007/0014126 A1* | 1/2007 | Kuo et al. | 362/600 |
| 2007/0171676 A1* | 7/2007 | Chang | 362/613 |
| 2008/0192507 A1* | 8/2008 | Chang | 362/633 |

* cited by examiner

Primary Examiner — Hoan C Nguyen

(57) ABSTRACT

The present invention discloses a backlight module and a liquid crystal display (LCD). A reflecting housing is disposed between a reflecting surface and an optical film. The reflecting housing comprises a first reflecting layer used to reflect the lights emitted from the light source to the reflecting surface, and a second reflecting layer used to reflect the lights emitted from the light source to the optical film. The optical film has reflection rates distributing along a predetermined trend, and the lights emitted to the optical film are through the optical film and uniformly emitting out in the reflection rates of the predetermined trend.

8 Claims, 4 Drawing Sheets

BACKLIGHT MODULE AND LIQUID CRYSTAL DISPLAY

FIELD OF THE INVENTION

The present invention relates to a field of liquid crystal display technology, and more particularly to a backlight module and a liquid crystal display (LCD).

BACKGROUND OF THE INVENTION

With the continuous development of liquid crystal technology, the requirement for the internal components of a liquid crystal display (LCD) is higher and higher.

Referring now to FIG. 1, a structural schematic view of a side-light type of backlight module in a traditional technology is illustrated in FIG. 1. In this figure, a light source 11 is disposed at one side of a light guide plate 12. The lights emitted from the light source 11 enter into the light guide plate 12, and then enter into an optical film 13.

Above-mentioned technology that the light guide plate 12 guides the lights of the light source 11 has problems as follows:

Firstly, because the light guide plate 12 has a characteristic of thermal expansion, the light source 11 and a light in surface of the light guide plate 12 can not achieve to seamless connection, so as to limit the improvement of the light coupling efficiency. Besides, the light source 11 has a certain size and the angular aperture of the light source 11 is larger, such as the angular aperture of an light emitting diode (LED) can approach to 90 degree, but the thickness of the light guide plate 12 is fixed, so that it is easy to cause a light leakage from the larger angle of the light source 11.

Secondly, the material of the light guide plate 12 can absorb one part of lights. For example, if the structure of the light guide plate 12 is adopted dot structures, the dot structures will absorb one part of lights, so it will lower the light utilization rate. Besides, the material of the light guide plate 12 has different absorbed rate to different wave frequency, so that with the increasing of the transmission distance in the light guide plate 12, a light out surface 122 of the light guide plate 12 will appear a chromatism phenomenon.

Thirdly, with a development trend of the LCD is toward light-thin and reduction, it is necessary to simplify the LCD structure, but the existence of the light guide plate 12 obstructs the light-thin development of the LCD. Besides, the light guide plate 12 will increase the complexity in design of the backlight module, such as considering of that a warp phenomenon will happen in the light guide plate 12, so that the designing accuracy of components inside the LCD needs to be readjusted. Therefore, the material cost of the light guide plate 12 is expensive, so that the manufacture cost of the LCD will be increased.

Because of that: the light coupling efficiency between the light guide plate 12 and the light source 11 is low; the lights absorbed by the light guide plate 12 lower the light utilization rate causing the chromatism phenomenon; and the light guide plate 12 obstructs the light-thin development trend of the LCD, so as to increase the design complexity and cost and so on. Hence, it is necessary to research a technology to omit the light guide plate 12.

However, the reflection rate on the optical film 13 is uniform, so in a backlight mode of side light in, with the distances with the light source 11 are different, each of parts of the optical film 13 get the different illumination intensity and luminous flux. If the light guide plate 12 is omitted, and in the condition of that the reflection rate on the optical film 13 is uniform, the lights emitted to the optical film 13 can not be uniform, so it will cause a chromatism phenomenon.

As described above, how to omit the light guide plate and to ensure the lights emitted to the optical film keeping uniform to avoid the chromatism phenomenon in such condition is become one of the research directions of the field of liquid crystal display technologies.

SUMMARY OF THE INVENTION

One of the objects of the present invention is to provide a backlight module, which can omit a light guide plate, and in such condition, it can ensure lights emitted to an optical film keeping uniform to avoid a chromatism phenomenon.

For achieving the above-mentioned beneficial effect, the present invention constructs a backlight module, which comprising: at least one light source and an optical film, wherein the backlight module further comprises at least one reflecting housing and a reflecting surface; the reflecting surface is parallel with the optical film; the reflecting surface and the optical film are symmetrically disposed with respect to the light source, and are disposed in identical side of the source;

wherein the reflecting housing is disposed between the reflecting surface and the optical film; the reflecting housing comprises a first reflecting layer used to reflect the lights emitted from the light source to the reflecting surface, and a second reflecting layer used to reflect the lights emitted from the light source to the optical film; and the first reflecting layer has a first arc shape and corresponds to the reflecting surface, so that the lights reflected by the first reflecting layer are reflected into the reflecting surface;

wherein the optical film has reflection rates distributing along a predetermined trend, and a certain part of the reflection rate of the optical film is decided by a received intensity of the lights and the luminous flux thereof, so that the lights emitted to the optical film are through the optical film and uniformly emitting out in the reflection rates of the predetermined trend.

In the backlight module of the present invention, the predetermined trend is: along the light out direction of the source, the reflection rate of the optical film starts from a start point; it gradually increases to a first high point; it gradually decreases to a low point, and the reflection rate of the optical film gradually increase to a second high point again.

In the backlight module of the present invention, the second reflecting layer has a second arc shape and corresponds to the optical film, so that the lights reflected by the second reflecting layer are reflected into the optical film.

In the backlight module of the present invention, the first reflecting layer and the second reflecting layer of the reflecting housing are a symmetric structure, and the symmetric axis of the symmetric structure clockwise rotates a predetermined angle with the horizon line of the optical film.

Another one of the objects of the present invention is to provide a backlight module, which can omit a light guide plate, and in such condition, it can ensure lights emitted to a optical film keeping uniform to avoid a chromatism phenomenon.

For achieving the above-mentioned beneficial effect, the present invention constructs a backlight module, which comprising: at least one light source and an optical film, wherein the backlight module further comprises at least one reflecting housing and a reflecting surface; the reflecting surface is parallel with the optical film; the reflecting surface and the optical film are symmetrically disposed with respect to the light source, and are disposed in identical side of the source;

wherein the reflecting housing is disposed between the reflecting surface and the optical film; the reflecting housing comprises a first reflecting layer used to reflect the lights emitted from the light source to the reflecting surface, and a second reflecting layer used to reflect the lights emitted from the light source to the optical film;

wherein the optical film has reflection rates distributing along a predetermined trend, and a certain part of the reflection rate of the optical film is decided by a received intensity of the lights and the luminous flux thereof, so that the lights emitted to the optical film are through the optical film and uniformly emitting out in the reflection rates of the predetermined trend.

In the backlight module of the present invention, a certain part of the reflection rate of the optical film is decided by a received intensity of the lights and the luminous flux thereof.

In the backlight module of the present invention, the predetermined trend is: along the light out direction of the source, the reflection rate of the optical film starts from a start point; it gradually increases to a first high point; it gradually decreases to a low point, and the reflection rate of the optical film gradually increase to a second high point again.

In the backlight module of the present invention, the first reflecting layer has a first arc shape and corresponds to the reflecting surface, so that the lights reflected by the first reflecting layer are reflected into the reflecting surface; and the second reflecting layer has a second arc shape and corresponds to the optical film, so that the lights reflected by the second reflecting layer are reflected into the optical film.

In the backlight module of the present invention, the first reflecting layer and the second reflecting layer of the reflecting housing are a symmetric structure, and the symmetric axis of the symmetric structure clockwise rotates a predetermined angle with the horizon line of the optical film.

Further, another one of the objects of the present invention is to provide a liquid crystal display (LCD), which can omit a light guide plate, and in such condition, it can ensure lights emitted to a optical film keeping uniform to avoid a chromatism phenomenon.

For achieving the above-mentioned beneficial effect, the present invention constructs a LCD, which comprising a backlight module, wherein the backlight module comprises at least one light source and an optical film, and the backlight module further comprises at least one reflecting housing and a reflecting surface; the reflecting surface is parallel with the optical film; the reflecting surface and the optical film are symmetrically disposed with respect to the light source, and are disposed in identical side of the source;

wherein the reflecting housing is disposed between the reflecting surface and the optical film; the reflecting housing comprises a first reflecting layer used to reflect the lights emitted from the light source to the reflecting surface, and a second reflecting layer used to reflect the lights emitted from the light source to the optical film;

wherein the optical film has reflection rates distributing along a predetermined trend, and a certain part of the reflection rate of the optical film is decided by a received intensity of the lights and the luminous flux thereof, so that the lights emitted to the optical film are through the optical film and uniformly emitting out in the reflection rates of the predetermined trend.

In the LCD of the present invention, a certain part of the reflection rate of the optical film is decided by a received intensity of the lights and the luminous flux thereof.

In the LCD of the present invention, the predetermined trend is: along the light out direction of the source, the reflection rate of the optical film starts from a start point; it gradually increases to a first high point; it gradually decreases to a low point, and the reflection rate of the optical film gradually increase to a second high point again.

In the LCD of the present invention, the first reflecting layer has a first arc shape and corresponds to the reflecting surface, so that the lights reflected by the first reflecting layer are reflected into the reflecting surface; and the second reflecting layer has a second arc shape and corresponds to the optical film, so that the lights reflected by the second reflecting layer are reflected into the optical film.

In the LCD of the present invention, the first reflecting layer and the second reflecting layer of the reflecting housing are a symmetric structure, and the symmetric axis of the symmetric structure clockwise rotates a predetermined angle with the horizon line of the optical film.

In comparison with the traditional technologies, in the present invention, it uses the reflecting surface to replace a light guide plate of traditional technology, and disposes the reflecting housing covering the light source to reflect the lights to the reflecting surface and the optical film. Meanwhile, it is to set the reflection rate of the optical film by predetermined trend, for example a reflection rate at a certain part of the optical film is set according to how many of the illumination intensity and the luminous flux it gets, so that it makes the lights emitting to the optical film and are through the optical film can be uniformly emitted out, so that it can avoid the chromatism phenomenon and increase the quality of image display.

For above-mention contents of the present invention can be best understood by referring to the following detailed description of the preferred embodiments and the accompanying drawings.

DETAILED DESCRIPTION OF THE PREFERRED EMBODIMENTS

The description of the preferred embodiments refers to the drawings, so as to illustrate the specific embodiments of the present invention which can be carried out.

Figure 1:
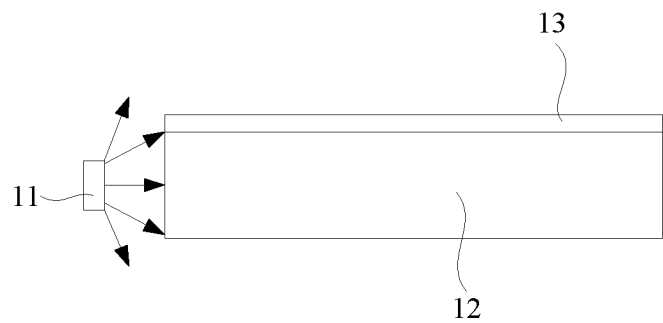
FIG. 1 is a structural schematic view of a backlight module in a traditional technology.
Figure 2:
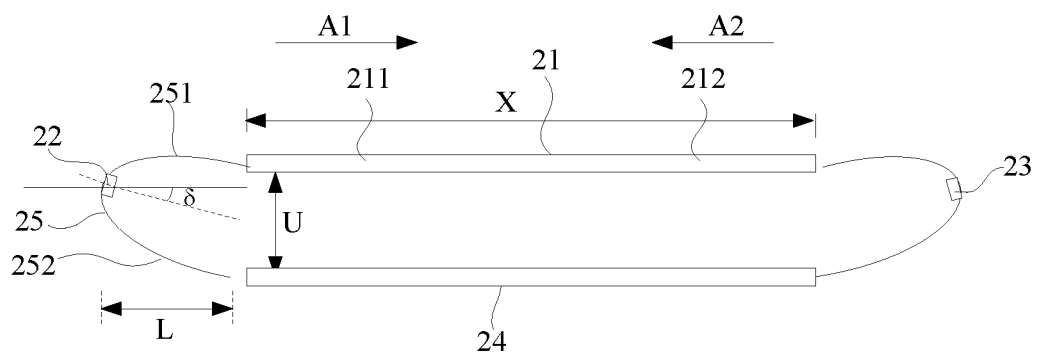
FIG. 2 is a structural schematic view of a backlight module of a first preferred embodiment according to the present invention.

Referring now to FIG. 2, a structural schematic view of a backlight module of a first preferred embodiment according to the present invention is illustrated in FIG. 2.

A backlight module comprises an optical film 21, a first light source 22, a second light source 23, a reflecting surface 24 and two reflecting housings 25, wherein each of the reflecting housings 25 comprises a first reflecting layer 251 and a second reflecting layer 252. The optical film 21 comprises a first optical surface 211 and a second optical surface 212 which are symmetric to each other.

The first light source 22 and the second light source 23 are disposed between the optical film 21 and the reflecting surface 24, and are symmetric to each other with respect to the optical film 21. The reflecting surface 24 and the optical film 21 are symmetrically disposed with respect to the first light source 22 and the second light source 23, and are between the first light source 22 and the second light source 23.

The first light source 22 is disposed between the first reflecting layer 251 and the second reflecting layer 252, wherein one end of the first reflecting layer 251 is connected with the first light source 22, and the other end of the first reflecting layer 251 is connected with the optical film 21; and one end of the second reflecting layer 252 is connected with the first light source 22, and the other end of the second reflecting layer 252 is connected with the reflecting surface 24.

In this embodiment, the reflecting surface 24 is preferably to be a manner of specular reflection, and is parallel with the optical film 21. Certainly, it can be the other reflecting manners, only the manner can reflect the lights to the optical film 21, so it is not listed one by one here.

The first reflecting layer 251 of the reflecting housing 25 is used for reflecting the lights emitted from the first light source 22 to the reflecting surface 24; and the second reflecting layer 252 of the reflecting housing 25 is used for reflecting the lights emitted from the first light source 22 to the optical film 21.

The first reflecting layer 251 is preferably been a first arc shape, so that the lights reflected by the first reflecting layer 251 can completely be reflected to the reflecting surface 24; and the second reflecting layer 252 is preferably been a second arc shape, so that the lights reflected by the second reflecting layer 252 can completely be reflected to the optical film 21.

Among them, the first reflecting layer 251 having the first arc shape and the second reflecting layer 252 having the second arc shape are a symmetric structure, and combine as a compound parabola collimator (CPC). The lights emitted from the first light source 22 are reflected by the reflecting housing 25, and then the shape of the lights can be readjusted. The reflected angular aperture γ is smaller than 30°, namely, by using the symmetric axis of the reflecting housing 25 (CPC) as a normal line, the included angle between the reflected lights and the normal line are distributed within a range of ±30°.

Figure 3:
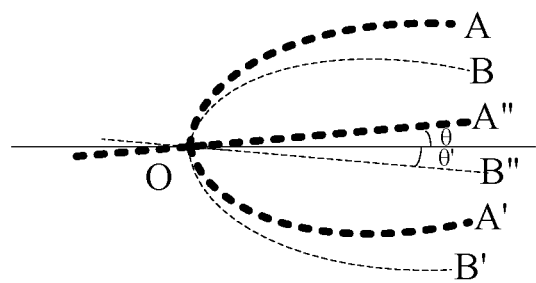
FIG. 3 is a schematic view for forming a parabolic surface of the reflecting housing in the FIG. 2.
Figure 4:
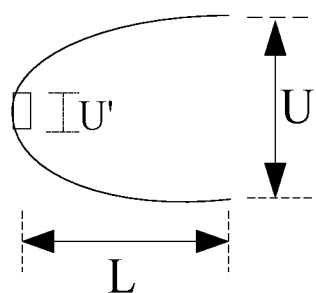
FIG. 4 is a schematic view of the parabolic surface of the reflecting housing in the FIG. 2.

Referring to FIGS. 3 and 4, FIG. 3 is a schematic view for explaining how a parabolic surface of the reflecting housing 25 according to the present invention is formed; and FIG. 4 is a schematic view of the parabolic surface of the reflecting housing 25 according to the present invention.

In these figures, the symmetric axes of the parabolic surfaces are both on a horizontal plane, and each of the symmetric axes has a deviation angle to the horizon plane, and then they combine as a compound parabolic surface. Fox example as shown in FIG. 3, the parabolic surface AOA' counterclockwise rotates a θ angle, and the parabolic surface BOB' clockwise rotates a θ' angle, so that the curve BOA' and AOB' combine as the compound parabolic surface.

In a specific embodiment process, it is to select a fit expression equation of the parabolic surface, and to rotate a fit angle, so it makes the focus of the parabolic surface AOA' is close to the parabolic surface BOB', and the focus of the parabolic surface BOB' is close to the parabolic surface AOA', so that the curve BOA' combine as a compound parabolic surface of the reflecting housing 25 as shown in FIG. 4. Besides, in this embodiment, it is to put the light out surfaces of the first light source 22 and the second light source 23 to close the plane which the focuses of the parabolic surface AOA' and the parabolic surface BOB' are, and it can achieve a collimate effect for the reflecting housing 25 (CPC) to the light out surfaces of the first light source 22 and the second light source 23.

Referring to FIGS. 2 and 4 at the same time, the depth of the reflecting housing 25 is L; the opening diameter of the reflecting housing 25 is U; the width of the light out surface of the first light source 22 is U'; and the angular aperture of the first light source 22 is γ'. The above-mentioned parameters can satisfy the equation:

$$\sin\gamma \times U = \sin\gamma' \times U';$$

For the first light source 22, the angular aperture is 90°, and then $$\sin\gamma \times U = U',$$

wherein $0.25 < U/L < 0.75$.

In this embodiment, the clockwise rotating predetermined angle of the symmetric axis of the reflecting housing 25 is δ, wherein $0 \leq \delta \leq 10$. By clockwise rotating predetermined angle δ of the symmetric axis of the reflecting housing 25, it can effectively avoid that the near light end (the end close to the first light source 22) of the optical film 21 gets too strong of the illumination to cause the chromatism.

The above-mentioned parameters can be amended as:

$$\sin\gamma \times U = \sin\gamma' \times U' \times \cos\delta$$

In a specific embodiment process, the lights emitted from the first light source 22 are collimated by the reflecting housing 25, and one part of lights is emitted to the optical film 21. The maximum value β of the included angle between these lights and the horizon plane is:

$$\beta\max = a\tan((U+U')/2/L);$$

The minimum value is:

$$\beta\min = a\tan((U+U')/2/(L+X));$$

In above-mentioned equation, the length of the optical film 21 is X, and if the lights want to uniformly emit onto the optical film 21, the intensity of the lights I(β) needs to satisfy the equation:

$$(\beta) = I\beta 0/(\sin(\beta))^3;$$

β corresponds to X has:

$$I(X) = IX0/(\sin(a\tan((U+U')/2/(L+X))))^3,$$

wherein Iβ0, IX0 are constant; I(X) is an ideal illumination intensity of the lights which are collimated by the reflecting housing 25 and emitted onto the optical film 21 (please referring to FIG. 5).

Certainly, in a specific embodiment process, the lights emitted from the first light source 22 will be reflected between the optical film 21 and the reflecting surface 24, repeatedly. If the lights want to form a uniform illumination on the optical film 21, the intensity of lights of a far light end will not be as steep as the ideal illumination intensity in FIG. 5. Besides, another part of lights emitted from the reflecting housing 25 are toward the reflecting surface 24, and then further reflect to the optical film 21, so the part of the lights will be added to the ideal illumination intensity I(X) on the light in surface of the optical film 21, so that the trend of the illumination intensity will become gentler. Meanwhile, the variation trend of the illumination intensity of the near light end will not be increased, monotonously.

Figure 5:
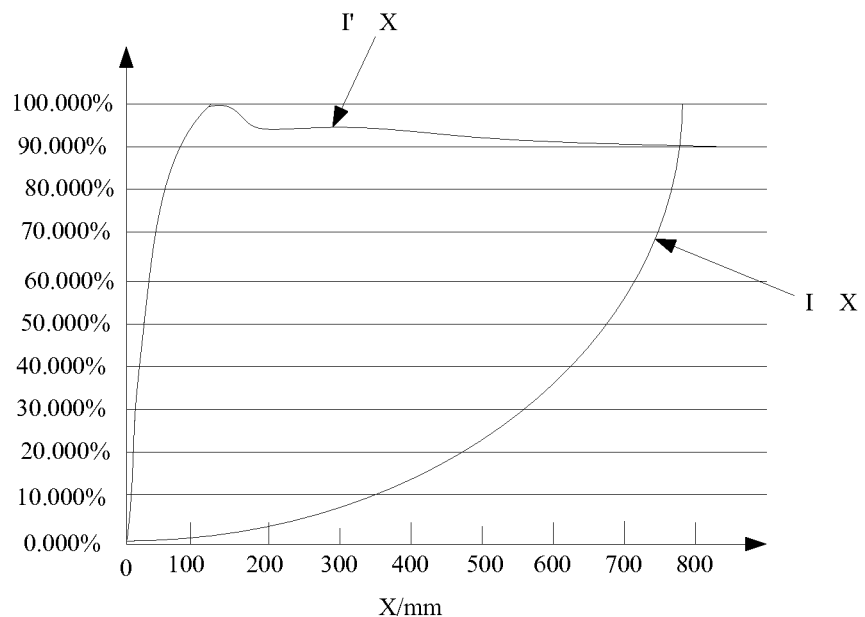
FIG. 5 is a schematic view of illumination intensity of a first preferred embodiment according to the present invention.

Still referring to FIG. 5, in this embodiment,

I'(X) is an illumination intensity of emitted lights out of the reflecting housing 25, and the illumination intensity thereof emitted onto the optical film 21 is not uniform.

In a specific embodiment process, a certain part of the reflection rate of the optical film 21 is decided by a received intensity of the lights and the luminous flux thereof. Certainly, it can be designed by other methods. For example, the reflection rate R(X) of the optical film 21 is a function which includes an ideal illumination intensity I(X), an illumination intensity I'(X) and a predetermined angle δ, namely:

$$R(X)=F(I(X),I'(X),\delta);$$

For example:

$$R(X)=\epsilon(X,\delta)\cdot(I(X)/I'(X));$$

In the equation, $\epsilon(X, \delta)$ is a factor for modulation, and the factor is relative to the ideal illumination intensity I(X) and the predetermined angle δ. Certainly, the reflection rate R(X) also can be expressed by other functions, only can express the influence by the illumination intensity I'(X), the ideal illumination intensity I(X) and the predetermined angle δ, so it is not listed one by one here.

Figure 6:
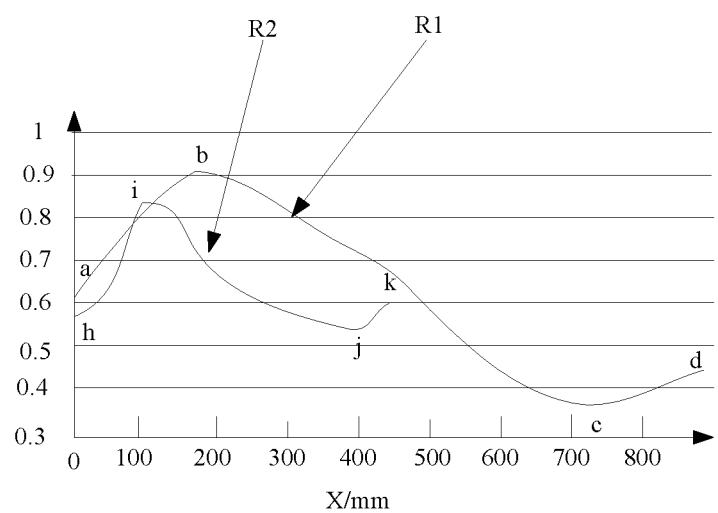
FIG. 6 is a schematic view of reflection rate of an optical film according to a first preferred embodiment of the present invention.

Referring to FIG. 6, the curve R1 is a reflection rate of the optical film 21 of a first embodiment according to the present invention (namely, a reflection rate of the optical film 21 in a case of two short sides)

Referring to FIG. 2 at the same time, along a direction A1 from the first light source 22 toward the second light source 23, the reflection rate R1 of the first optical surface 211 of the optical film 21 starts from a start point a; it gradually increases to a first high point b; the reflection rate R1 gradually decreases to a low point c; and the reflection rate R1 of the first optical surface 211 of the optical film 21 gradually increases to a second high point d again.

The working principle of the first preferred embodiment of the backlight module in FIG. 2 to 6 is described as follow:

When the backlight module in a emitting operation, such as the first light source 22, the lights emitted from the first light source 22 are departed into three parts: one part of them directly enter into the reflecting surface 24 and the optical film 21, and they are reflected by the reflecting surface 24 or the optical film 21 repeatedly, so as to be emitted out of the backlight module 21; another part of them are reflected entering into the reflecting surface 24 by reflecting of the first reflecting layer 251 of the reflecting housing 25, and they are reflected entering into the optical film 21 by the reflecting of the reflecting surface 24; and the other part of them are reflected entering into the optical film 21 by the reflecting of the second reflecting layer 252 of the reflecting housing 25.

Referring to FIG. 6 at the same time, such as the output lights of first light source 22, along a direction A1 from the first light source 22 toward the second light source 23, the reflection rate R1 of the first optical surface 211 of the optical film 21 starts from a start point a; it gradually increases to a first high point b; the reflection rate R1 gradually decreases to a low point c; and the reflection rate R1 of the first optical surface 211 of the optical film 21 gradually increases to a middle high point d again by the function of the second source 22 to the first optical surface 211.

For the optical film 21, when the place where gets the more illumination intensity and luminous flux (optical energy density), the more reflection rate R1; when the place where gets the less illumination intensity and luminous flux (optical energy density), the less reflection rate R1. By above-mention method, it makes the lights emitting to the optical film 21 and are through the optical film 21 can be uniformly emitted out, so that it can avoid the chromatism phenomenon and increase the quality of image display.

Figure 7:
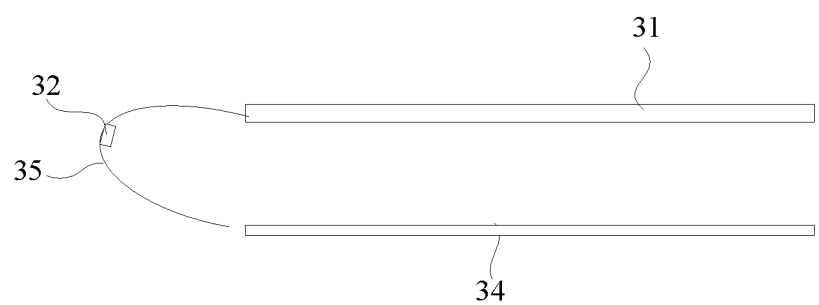
FIG. 7 is a structural schematic view of a backlight module of a second preferred embodiment according to the present invention.

FIG. 7 is a structural schematic view of a backlight module of a second preferred embodiment according to the present invention. The second preferred embodiment as shown in FIG. 7 comprises an optical film 31, a first light source 32, a reflecting surface 34 and one reflecting housings 35.

The difference between the second preferred embodiment and the first preferred embodiment in FIG. 2 is that: the second preferred embodiment is a mode of single side light in, namely, it only has one first light source 32. Besides, in the second preferred embodiment, the predetermined trend of the reflection rate R2 (referring to the R2 in FIG. 6, namely, a reflection rate of the optical film 31 in a case of one short sides) of the optical film 31 is that: along the light out direction B of the first light source 32, the reflection rate of the optical film 31 starts from a start point h; it gradually increases to a first high point i; it gradually decreases to a low point j, and the reflection rate R2 of the optical film 31 gradually increase to a second high point f again by the reflection of a far light end.

The working principle of the second preferred embodiment as show in FIG. 7 can refer the working principle of the first preferred embodiment in FIG. 2 to 6, so it does not repeat again.

The present invention uses a reflecting surface to replace the light guide plate of traditional technology, and is provided with a reflecting housing for reflecting the lights to the reflecting surface and the optical film. Meanwhile, it is to set the reflection rate of the optical film by predetermined trend, for example a reflection rate at a certain part of the optical film is set according to how many of the illumination intensity and the luminous flux it gets, so that it makes the lights emitting to the optical film 21 and are through the optical film 21 can be uniformly emitted out, so that it can avoid the chromatism phenomenon and increase the quality of image display.

As described above, the present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising: at least one light source and an optical film, wherein the backlight module further comprises at least one reflecting housing and a reflecting surface; the reflecting surface is parallel with the optical film; the reflecting surface and the optical film are symmetrically disposed with respect to the light source, and are disposed in identical side of the light source;

wherein the shape of the reflecting surface is completely flat without any rise and fall;

wherein the reflecting housing is disposed between the reflecting surface and the optical film; the reflecting housing comprises a first reflecting layer to reflect the lights emitted from the light source to the reflecting surface, and a second reflecting layer to reflect the lights emitted from the light source to the optical film; and the first reflecting layer has a first arc shape and corresponds to the reflecting surface, so that the lights reflected by the first reflecting layer are reflected into the reflecting surface;

wherein the optical film is completely flat without any rise and fall, and has various reflection rates, and a certain part of the reflection rate of the optical film is decided by a received intensity of the lights and the luminous flux thereof, so that the lights emitted to the optical film are through the optical film and uniformly emitting out in the reflection rates of the predetermined trend;

wherein the reflection rates are along the light out direction of the light source, the reflection rate of the optical film starts from a start point; it gradually increases to a first high point; it gradually decreases to a low point, and the reflection rate of the optical film gradually increase to a second high point again;

wherein the first reflecting layer and the second reflecting layer of the reflecting housing are a symmetric structure, and the symmetric axis of the symmetric structure rotates clockwise a predetermined angle with the horizon line of the optical film.

2. The backlight module according to claim 1, wherein the second reflecting layer has a second arc shape and corresponds to the optical film, so that the lights reflected by the second reflecting layer are reflected into the optical film.

3. A backlight module, comprising: at least one light source and an optical film, wherein the backlight module further comprises at least one reflecting housing and a reflecting surface; the reflecting surface is parallel with the optical film; the reflecting surface and the optical film are symmetrically disposed with respect to the light source, and are disposed in identical side of the light source;

wherein the shape of the reflecting surface is completely flat without any rise and fall;

wherein the reflecting housing is disposed between the reflecting surface and the optical film; the reflecting housing comprises a first reflecting layer to reflect the lights emitted from the light source to the reflecting surface, and a second reflecting layer to reflect the lights emitted from the light source to the optical film;

wherein the optical film is completely flat without any rise and fall, and has various reflection rates, and a certain part of the reflection rate of the optical film is decided by a received intensity of the lights and the luminous flux thereof, so that the lights emitted to the optical film are through the optical film and uniformly emitting out in the reflection rates of the predetermined trend;

wherein the reflection rates are along the light out direction of the light source, the reflection rate of the optical film starts from a start point; it gradually increases to a first high point; it gradually decreases to a low point, and the reflection rate of the optical film gradually increase to a second high point again;

wherein the first reflecting layer and the second reflecting layer of the reflecting housing are a symmetric structure, and the symmetric axis of the symmetric structure rotates clockwise a predetermined angle with the horizon line of the optical film.

4. The backlight module according to claim 3, wherein a certain part of the reflection rate of the optical film is decided by a received intensity of the lights and the luminous flux thereof.

5. The backlight module according to claim 3, wherein the first reflecting layer has a first arc shape and corresponds to the reflecting surface, so that the lights reflected by the first reflecting layer are reflected into the reflecting surface; and the second reflecting layer has a second arc shape and corresponds to the optical film, so that the lights reflected by the second reflecting layer are reflected into the optical film.

6. A liquid crystal display (LCD), comprising a backlight module, wherein the backlight module comprises at least one light source and an optical film, and the backlight module further comprises at least one reflecting housing and a reflecting surface; the reflecting surface is parallel with the optical film; the reflecting surface and the optical film are symmetrically disposed with respect to the light source, and are disposed in identical side of the light source;

wherein the shape of the reflecting surface is completely flat without any rise and fall;

wherein the reflecting housing is disposed between the reflecting surface and the optical film; the reflecting housing comprises a first reflecting layer to reflect the lights emitted from the light source to the reflecting surface, and a second reflecting layer to reflect the lights emitted from the light source to the optical film;

wherein the optical film is completely flat without any rise and fall, and has various reflection rates, and a certain part of the reflection rate of the optical film is decided by a received intensity of the lights and the luminous flux thereof, so that the lights emitted to the optical film are through the optical film and uniformly emitting out in the reflection rates of the predetermined trend;

wherein the reflection rates are along the light out direction of the light source, the reflection rate of the optical film starts from a start point; it gradually increases to a first high point; it gradually decreases to a low point, and the reflection rate of the optical film gradually increase to a second high point again;

wherein the first reflecting layer and the second reflecting layer of the reflecting housing are a symmetric structure, and the symmetric axis of the symmetric structure rotates clockwise a predetermined angle with the horizon line of the optical film.

7. The LCD according to claim 6, wherein a certain part of the reflection rate of the optical film is decided by a received intensity of the lights and the luminous flux thereof.

8. The LCD according to claim 6, wherein the first reflecting layer has a first arc shape and corresponds to the reflecting surface, so that the lights reflected by the first reflecting layer are reflected into the reflecting surface; and the second reflecting layer has a second arc shape and corresponds to the optical film, so that the lights reflected by the second reflecting layer are reflected into the optical film.

* * * * *